(12) United States Patent
McLoughlin

(10) Patent No.: US 10,106,099 B1
(45) Date of Patent: Oct. 23, 2018

(54) STORAGE ASSEMBLIES AND BUCKET ACCESSORIES FOR TRACTORS

(71) Applicant: John E. McLoughlin, Happauge, NY (US)

(72) Inventor: John E. McLoughlin, Happauge, NY (US)

( * ) Notice: Subject to any disclaimer, the term of this patent is extended or adjusted under 35 U.S.C. 154(b) by 0 days.

(21) Appl. No.: 15/880,415

(22) Filed: Jan. 25, 2018

Related U.S. Application Data

(60) Continuation-in-part of application No. 15/599,301, filed on May 18, 2017, now abandoned, which is a division of application No. 15/170,947, filed on Jun. 2, 2016, now abandoned.

(60) Provisional application No. 62/171,515, filed on Jun. 5, 2015.

(51) Int. Cl.
| | |
|---|---|
| *B60R 9/06* | (2006.01) |
| *B60R 9/042* | (2006.01) |
| *B60R 11/06* | (2006.01) |
| *B60R 11/00* | (2006.01) |

(52) U.S. Cl.
CPC .............. *B60R 9/06* (2013.01); *B60R 9/0423* (2013.01); *B60R 11/06* (2013.01); *B60R 2011/004* (2013.01)

(58) Field of Classification Search
CPC ....... B60R 9/0423; B60R 9/0485; B60R 9/06; B60R 11/06; B60R 2011/004
USPC ............ 37/409; 224/537; 414/462, 723, 912
See application file for complete search history.

(56) References Cited

U.S. PATENT DOCUMENTS

| | | | | | |
|---|---|---|---|---|---|
| 2,237,853 | A | * | 4/1941 | Troche | B60R 9/0485 182/127 |
| 2,247,128 | A | * | 6/1941 | Levey | B60P 3/1025 114/344 |
| 2,885,102 | A | * | 5/1959 | Duncan | B60P 3/1025 182/141 |
| 5,846,045 | A | * | 12/1998 | Johnson | B60P 1/6454 414/462 |
| 5,853,279 | A | * | 12/1998 | Neugebauer | B60P 3/122 414/462 |
| 2002/0190534 | A1 | * | 12/2002 | Armstrong | B60P 3/40 296/3 |
| 2011/0049207 | A1 | * | 3/2011 | Hufgard | B60P 3/07 224/510 |
| 2014/0239025 | A1 | * | 8/2014 | Scott | B60R 9/045 224/405 |

* cited by examiner

*Primary Examiner* — Saul Rodriguez
*Assistant Examiner* — Brendan P Tighe
(74) *Attorney, Agent, or Firm* — Louise S. Heim

(57) ABSTRACT

Storage assemblies and bucket accessories for material-handling vehicles are provided. One assembly includes a tool tray mounted above the hood of a front-end loading tractor. The tool tray is supported by tray-supporting members that are secured to tubular implement holders provided along opposite sides of the tractor. The tubular implement holders are coupled to the front bumper of the tractor and extend rearwardly and upwardly at an oblique angle with respect to the front bumper so that they do not interfere with movement of the tractor bucket.

2 Claims, 8 Drawing Sheets

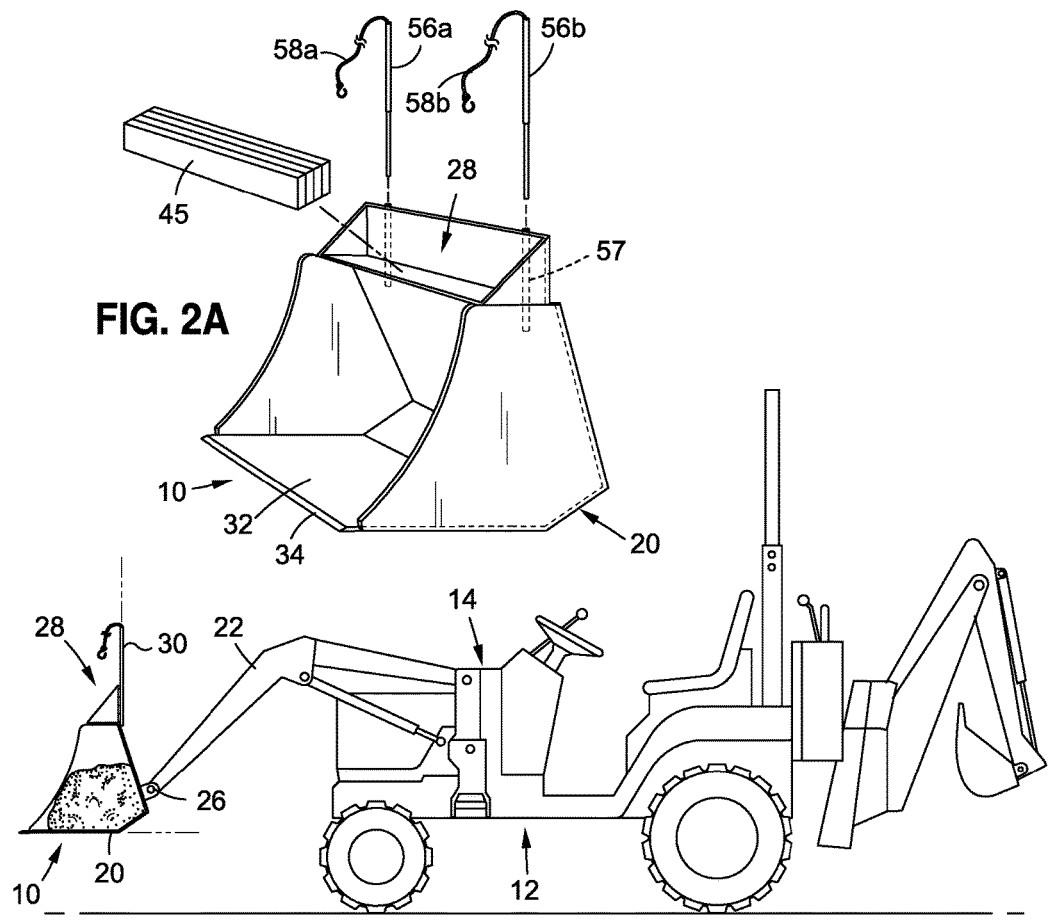
FIG. 2A
FIG. 3
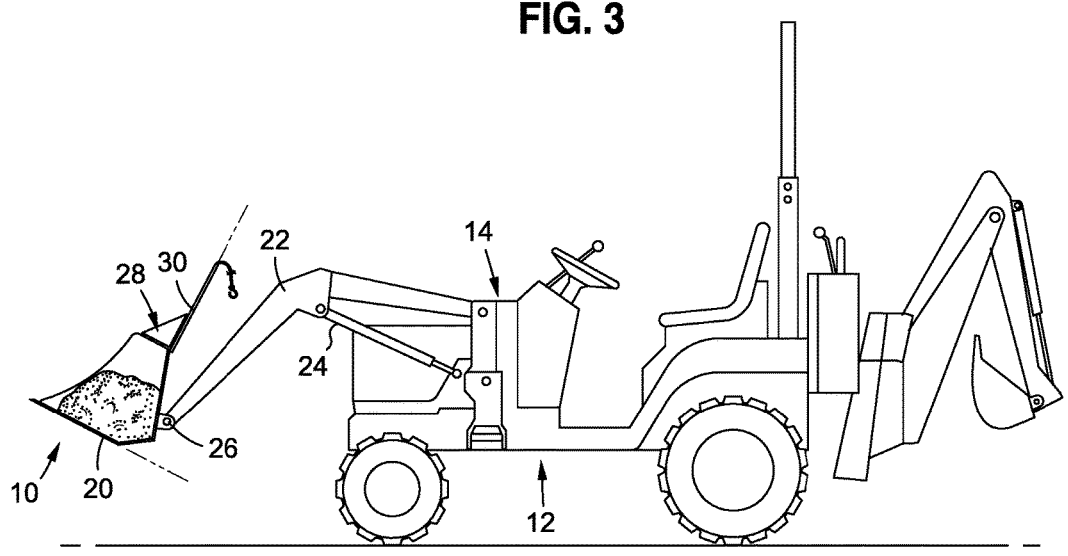
FIG. 4

STORAGE ASSEMBLIES AND BUCKET ACCESSORIES FOR TRACTORS

CROSS-REFERENCE TO RELATED TO APPLICATIONS

This application is a continuation-in-part of U.S. divisional of U.S. non-provisional application Ser. No. 15/599,301, which is a divisional of non-provisional application Ser. No. 15/170,947, filed Jun. 2, 2016, which claims the benefit of U.S. Provisional Application No. 62/171,515 filed on Jun. 5, 2015.

FIELD OF THE INVENTION

This invention relates to storage assemblies for material-handling vehicles.

More specifically, the invention relates to attachments for increasing the amount of supplies carried in or on compact and sub-compact material-handling vehicles.

In a further and more specific embodiment, the invention relates to storage assemblies and bucket accessories for lawn tractors and riding mowers.

BACKGROUND

Tractors and other material-handling vehicles were originally used primarily in construction, farming, and industry, but in recent years, they have become available in more compact configurations, making them affordable and useful for homeowners working on do-it-yourself landscaping projects and the like. Among the most popular configurations of these compact and sub-compact material-handling vehicles are front-engine lawn tractors and rear-engine riding mowers. Lawn tractors are generally more powerful than riding mowers and are often used for towing or fitted with front buckets for plowing and earth-moving, while riding mowers are lighter in weight and less versatile, but convenient for use on smaller properties.

One drawback of these smaller-sized tractors and mowers is that they lack space for carrying tools and other supplies. Some attempts have been made to provide tool tool-carrying assemblies in the forms of containers, racks, or carts that can be mounted on, or towed behind, the rear end of front-engine lawn tractors, but such assemblies have either been so compact and specialized as to limit the number and type of tools and supplies that can be carried, or at the other extreme, so large and bulky as to decrease the maneuverability of the tractor. Attempts have also been made to design tool boxes for mounting on the front end of front-engine lawn tractors, but these have presented the possibility of interfering with air flow to and from the engine, which could lead to overheating. Tool-carrying assemblies designed specifically for the rear end of rear-engine riding mowers, to the best of the inventor's knowledge, have not previously been designed, possibly because of concerns that extra weight in the back of the tractor could adversely impact the stability of the mower, as well as concerns about interfering with engine cooling and exhaust.

In the case of front-engine lawn tractors with buckets, the buckets themselves can of course be used to carry bulky materials, but elongated items that are longer than the width of the bucket cannot be accommodated. In addition, small, loose items are likely to rattle around in the interior of the bucket, causing irritating and unnecessary noise, and are also at risk of falling out altogether.

Another problem associated with front-loader tractors is that the bucket interferes with the operator's line of sight, making it difficult for the operator to judge the angle at which the bucket is tilted. Various attempts have been made to provide indicator mechanisms that overcome this problem. Examples of such mechanisms can be found in U.S. Pat. No. 4,604,025 to Hammoud, U.S. Pat. No. 7,430,983 to Hicock et al., U.S. Pat. No. 8,038,380 to Operud, and U.S. Pat. No. 8,205,347 to Friesen. However, the indicators of Hammoud, Hicock et al., and Friesen are somewhat complex devices requiring moving parts and/or electronic components. The indicators disclosed by Operud are simpler, but do not in any way address the problem of limited storage space in and on the vehicle.

Accordingly, it is object of this invention to provide versatile, tractor- or mower-mounted storage assemblies that can accommodate a large variety of tools and supplies, including large, bulky items, as well as long, narrow implements.

A further object of the invention is to provide tractor- or mower-mounted storage assemblies that are relatively compact and lightweight, and do not the adversely impact the stability of vehicle or the cooling ability of the engine.

Still another object of the invention is to provide storage assemblies that can be mounted on the rear end of rear-engine riding mowers and the front end of front-engine lawn tractors.

Yet another object of the invention is to provide material-handling vehicles with bucket storage assemblies that allow additional material, tools and/or supplies to be carried above the top edge of the bucket.

And yet another object of the invention is to provide orientation indicators that enable an operator of a material-handling vehicle to judge the angle at which a front-loader bucket is tilted, while also facilitating storage of additional material, tools, and/or supplies.

SUMMARY OF THE INVENTION

Briefly, to achieve the desired objects of the present invention in accordance with preferred embodiments thereof, storage assemblies and bucket accessories are provided for increasing the amount of supplies carried in or on compact and sub-compact material-handling vehicles.

In one aspect of the invention, a bucket assembly for a material-handling vehicle is provided with a storage compartment for allowing additional material to be carried above the top edge of the bucket, as well as with orientation indicators for allowing the vehicle's operator to accurately judge the angle of the bucket relative to the ground.

In an exemplary embodiment of the invention, the bucket assembly includes a bucket in the form of a trough having a bottom wall terminating in a bottom front edge, a top wall terminating in a top front edge, and a pair of side walls. The storage compartment comprises a shelf that extends along the front edge of the bucket, a back wall extending upwardly from a rear edge of the shelf, and a pair of side walls that are generally coplanar with the side walls of the bucket. The orientation indicators comprise a pair of free-standing, spaced-apart rods that project upwardly from the back wall of the storage compartment into the vehicle operator's line of sight. A flexible tie-down member having a hook or other attachment element at one end is secured to the distal end of each rod.

The height, strength, and distance between the orientation rods is preferably selected to allow a length of flexible elongated material such as a rope or hose to be wrapped around the rods and supported on the bucket. In addition, the tie-down members affixed to the orientation rods allow any material in either the bucket or the storage compartment, or both, to be secured in place. Thus, in addition to allowing the vehicle operator to judge the tilt of the bucket at any time, the orientation rods have the added value of increasing the amount of material that can be stored in and on the bucket.

In another embodiment, the tie-down members at the ends of the rods are eliminated, and a plurality of openings for receiving tie-down fasteners are formed along an edge of the shelf.

In another aspect of the invention, a pair of rack elements is provided for supporting elongated items such as ladders on the side of a material-handling vehicle having a bucket. A front rack element, which may be in the form of a U-shaped member or hook, is carried on the top end of an elongated rod that extends upwardly from a top edge of the bucket, and a rear rack element, which may also be in the form of a backwards L or U-shaped member or hook, extends laterally from a roll bar at the rear of the vehicle. The rack element engages the front end of at least one elongated item, and the rear rack element engages the rear end of the at least one elongated item.

In still another aspect of the invention, a tool carrying assembly configured for use with a material-handling vehicle includes a horizontally-extending tool tray that is supported above the engine of the vehicle by at least one support member. At least one implement holder configured to support an elongated tool in an upright position is secured to the vehicle alongside the tool tray. In one embodiment, the at least one implement holder, the tool tray, and the at least one support member are integrally secured to one another and to a base plate that is removably fastened to a rear bumper of the vehicle. In this embodiment, the support element may include at least one vertically extending leg having a length selected to provide sufficient clearance between the tool tray and the engine to avoid interference with exhaust and allow sufficient cooling of the engine. In another embodiment, the tool tray may be removably coupled to the at least one implement holder, which may be removably coupled to a bracket removably coupled to the front bumper of the vehicle. In this or other embodiments, the at least one implement holder may extend at a predetermined angle in a rearward direction relative to the mounting bracket, wherein the predetermined angle is selected such that an elongated implement contained in the implement holder will not interfere with movement of a bucket carried at the front end of the vehicle.

BRIEF DESCRIPTION OF THE DRAWINGS

The foregoing and more specific objects and advantages of the instant invention will become readily apparent to those skilled in the art from the following detailed description of the preferred embodiments thereof taken in conjunction with the drawings in which:

FIG. 2A is a perspective view illustrating the removability of the orientation rods from the bucket-mounted assembly of FIG. 1;

FIG. 3 is a side view showing a front-loader tractor with the bucket-mounted storage assembly of FIG. 1 in a first angular orientation;

FIG. 4 is a side view, similar to FIG. 3, with the bucket-mounted storage assembly of FIG. 1 in a second angular orientation;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
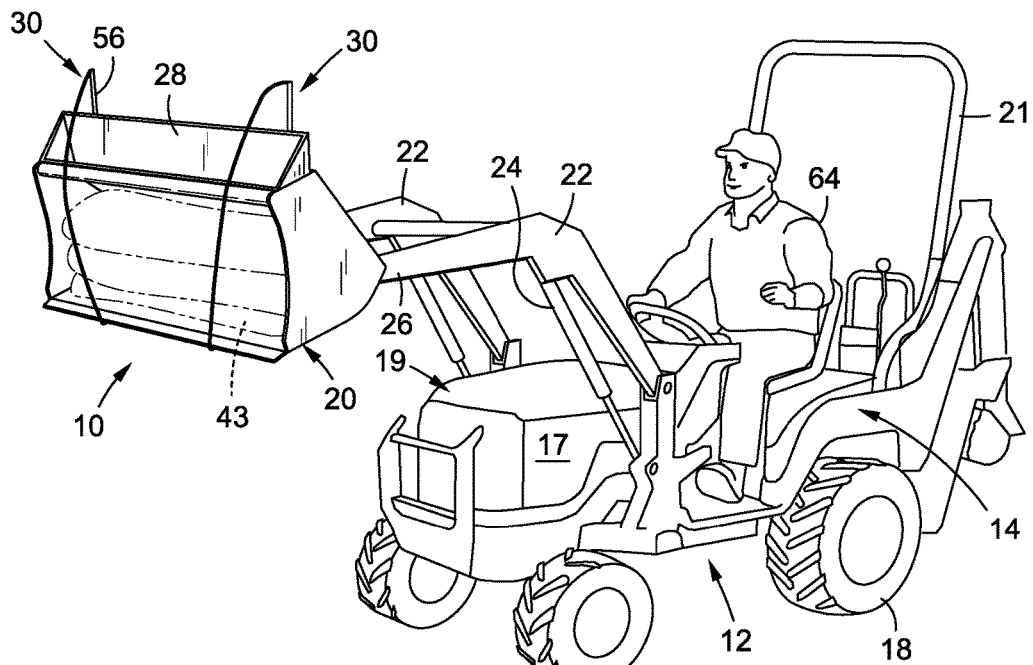
FIG. 1 is a perspective view showing a front-loader tractor equipped with a bucket-mounted storage assembly according to a first aspect of the present invention.

Turning now to the drawings, in which like numerals indicate corresponding elements throughout the several views, attention is first directed to FIG. 1, showing an assembly according to the present invention, indicated in its entirety by the numeral 10, mounted at the forward end of a tractor 12. Although the invention is not restricted to use with any particular type of material-handling vehicle 12, the illustrated vehicle 12 is a compact tractor including a frame 14 having a pair of opposed side walls 17, an engine mounted between the side walls 17 and protected by a hood 19, a pair of front wheels 16, rear wheels 18, a bucket 20, a roll bar 21, and a pair of support arms 22. A first pair of hydraulic cylinders 24 is provided for raising and lowering the support arms 22, and a second pair of hydraulic cylinders (not shown) is provided for pivoting the bucket 20 about the distal end 26 of the support arms 22.

Figure 2:
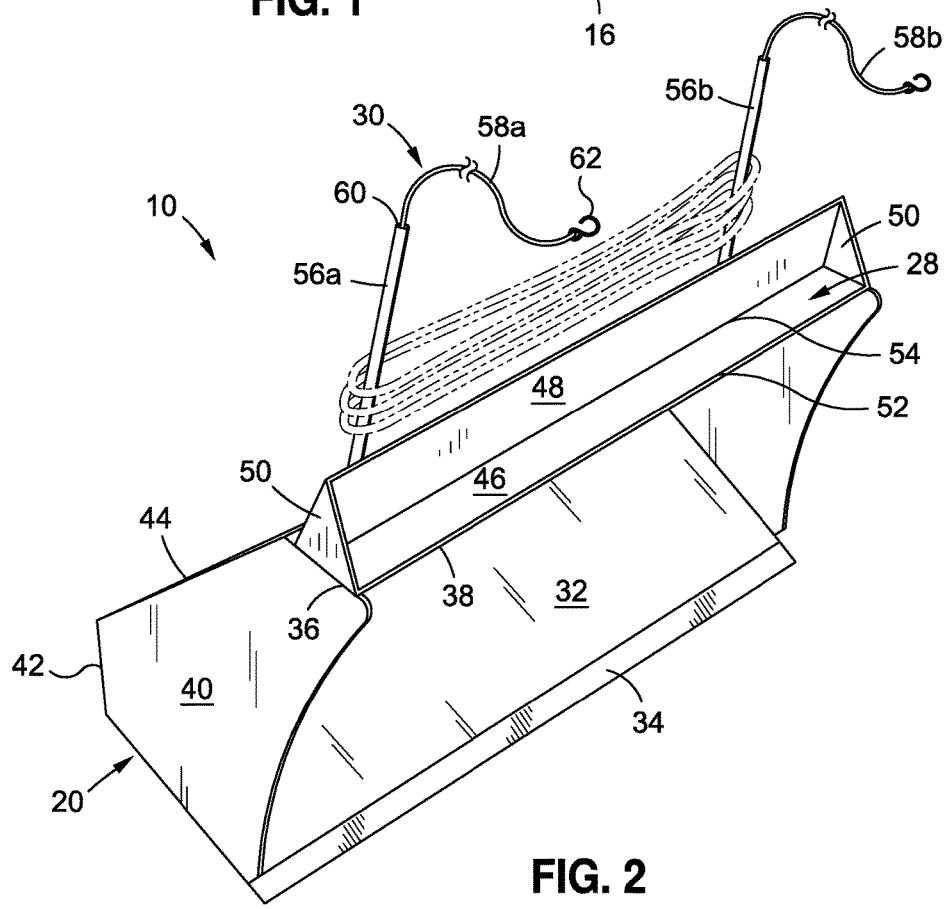
FIG. 2 is a perspective view of the bucket-mounted storage assembly of FIG. 1.

As seen in FIG. 2, the bucket assembly 10 comprises three major components: the bucket 20, a storage compartment 28, and orientation indicator assembly 30. the bucket 20 comprises a bottom wall 32 terminating in a bottom front edge 34, a top wall 36 terminating in a top front edge 38, and a pair of side walls 40 (only one shown) that extend perpendicularly to the bottom and top walls 32, 36. In the illustrated embodiment, the bottom and top walls, 32, 36 are generally planar and are joined together by a planar lower rear wall 42 and a planar upper rear wall 44, but other wall geometries may easily be envisioned. For instance, the planar upper wall and two rear walls could be replaced by a single curved upper wall. In any case, the bottom wall 32, upper wall 36 and side walls 40 together define a trough suitable for holding a variety of materials. such as the bagged material 43 shown in FIG. 1 or the loose material 45 shown in FIGS. 3 and 4.

The storage compartment 28 comprises a planar shelf 46, a back wall 48, and a pair of side walls 50. The shelf 46 includes an elongated front edge 52 and rear edge 54. In the illustrated embodiment, the shelf 46 is the same length as the bucket 20 and is positioned such that its front edge 52 is coextensive with the top front edge 38 of the bucket 20 and its side walls 50 are coplanar with the side walls 40 of the bucket 20. However, the length of the shelf 46 and the configuration of the side walls 50 could be changed without departing from the spirit of the invention.

The orientation indicator assembly 30 preferably comprises a pair of elongated rods 56*a, b* projecting upwardly from the rear wall 48 of the storage compartment 28. For indication purposes only, a single freestanding rod 56*a* may be used, but for storage purposes it is desirable to provide a second freestanding rod 56*b* located a sufficient distance from the first rod to enable a length of hose, rope, or similar flexible material to be coiled around the rods and stored or carried on top of the bucket 20. Preferably, each of the rods 56*a, b* is detachably held within a tubular mounting sleeve 57 on either the rear wall 48 or one of the side walls 50 of the storage compartment 28, as shown in FIG. 2A, so that the rods 56*a, b* can be removed when not in use, or replaced with longer or shorter rods as needed.

Figure 5:
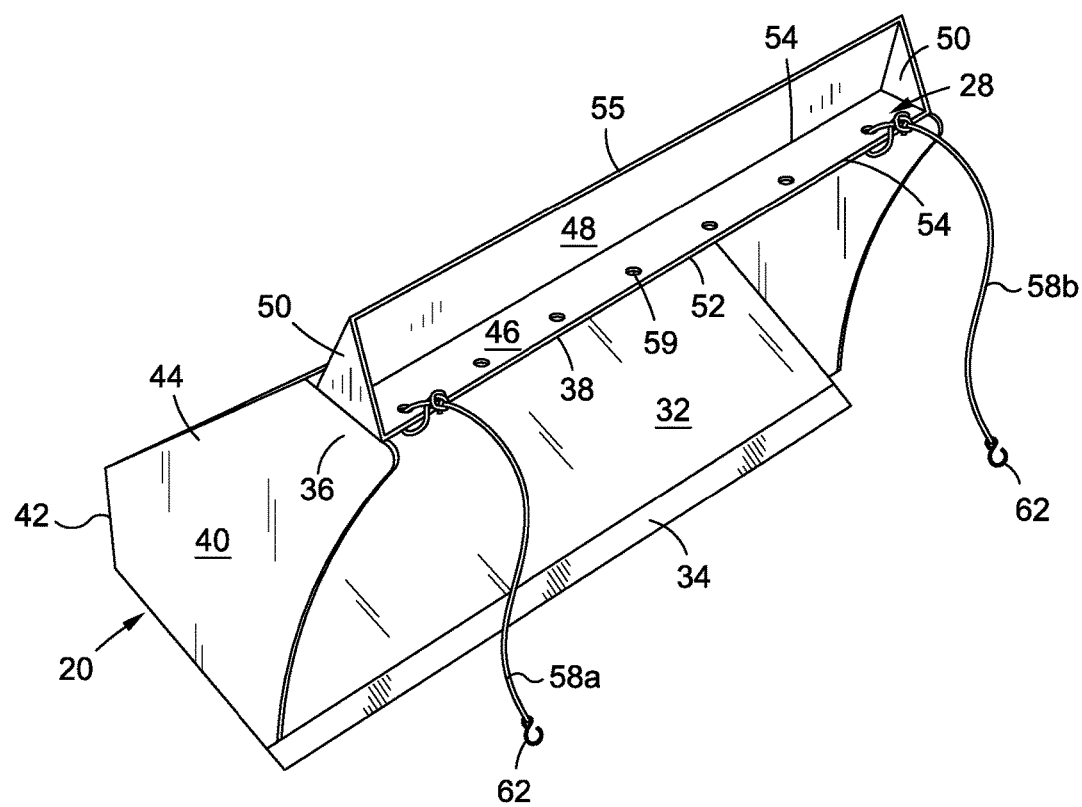
FIG. 5 is a perspective view showing an alternative embodiment of the bucket-mounted storage assembly.

A flexible tie-down member such as a bungee cord 58 *a, b* may be secured to the distal end 60 of each rod 56*a, b*. Each tie-down member preferably includes a hook 62 or similar attachment element that may be releasably fastened to the bottom front edge 34 of the bucket, thus securing items in place. The tie-downs may be used to secure bagged material 43 in the bucket 20, as shown in FIG. 1, or to secure elongated items such as boards 45 in the storage compartment 28, as shown in FIG. 2*a*, and can also be used to items or material in both the bucket 20 and the storage compartment 28 simultaneously. Alternatively, instead of being attached to the distal ends 60 of orientation rods 56*a*, bungee cords 58*a* may be secured to a plurality of openings 61 formed along either the bottom front edge 52 or the top edge 55 of the storage compartment 28, as shown in FIG. 5.

The length of the rods 58*a, b* must be sufficient to ensure that the rods 58*a, b* can be seen by an operator 64 seated in the tractor 12 when the bucket 20 is in its lowest position (i.e., when the bottom wall 32 is on the ground). The necessary length may vary depending on the type of vehicle on which the bucket assembly 10 is mounted; i.e. vehicles with very high seats or with large boom assemblies that block the operator's view when raised may require longer orientation rods. However, for a typical compact utility tractor, a length of 30 inches will suffice.

Figure 6:
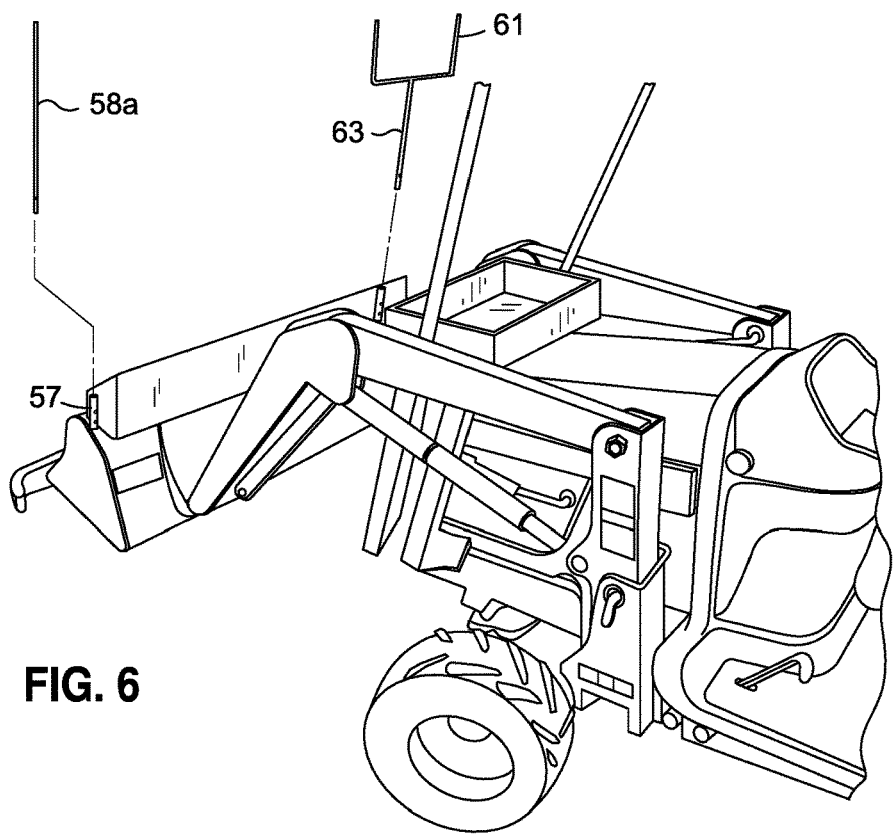
FIG. 6 is a perspective view showing a front portion of a rack assembly according to a second aspect of the present invention.
Figure 7:
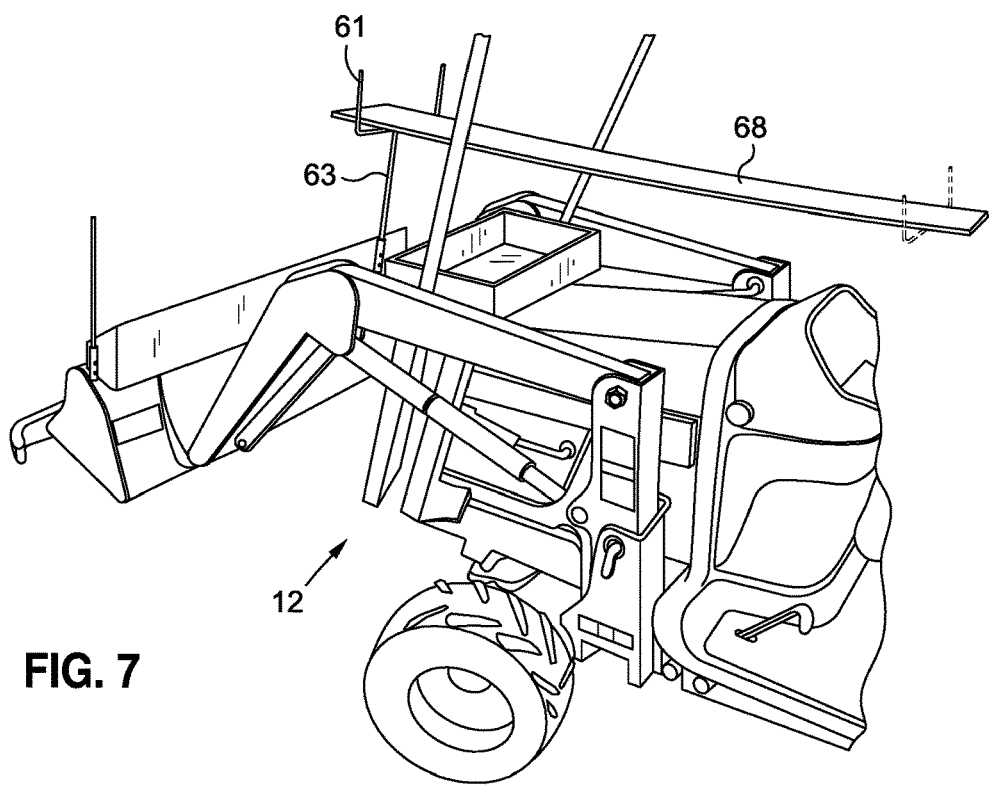
FIG. 7 is a perspective view from the front, showing the front portion of the rack assembly of FIG. 6, being used to transport an elongated board on a tractor.

In the embodiment of FIGS. 1-5, the top surface 36 of the bucket 20 is shown to be planar and coextensive with the planar bottom surface of shelf 46. However, if the top surface of the bucket is rounded, the bottom surface of the shelf 46 and top surface of the bucket will not be coextensive, but will only meet at the top front edge 38 of the bucket, resulting in a space between the bottom surface of the shelf 46 and the top surface of the bucket, as shown in FIGS. 6 and 7. The exact relationship between the bottom surface of the shelf 46 and the top surface of the bucket 20 is not critical, as long as the bottom surface of the shelf 46 is parallel to the bottom front edge 34 of the bucket 20, and the rear wall 48 of the storage compartment 28 is perpendicular to the bottom surface of the shelf 46. This ensures that the orientation rods 56*a*, 56*b* are perpendicular to the bottom wall 32 of the bucket 20. Thus, when the rods 56*a*, 56*b* are in a completely vertical position as shown in FIG. 3, the operator can infer that the bottom 32 of the bucket 20 is completely horizontal, i.e. parallel to the ground. Similarly, when the rods 56*a*, 56*b* extend toward the tractor 12, the operator can infer that the bottom wall 32 of the bucket is tilted away from the ground, as shown in FIG. 4.

Figure 8:
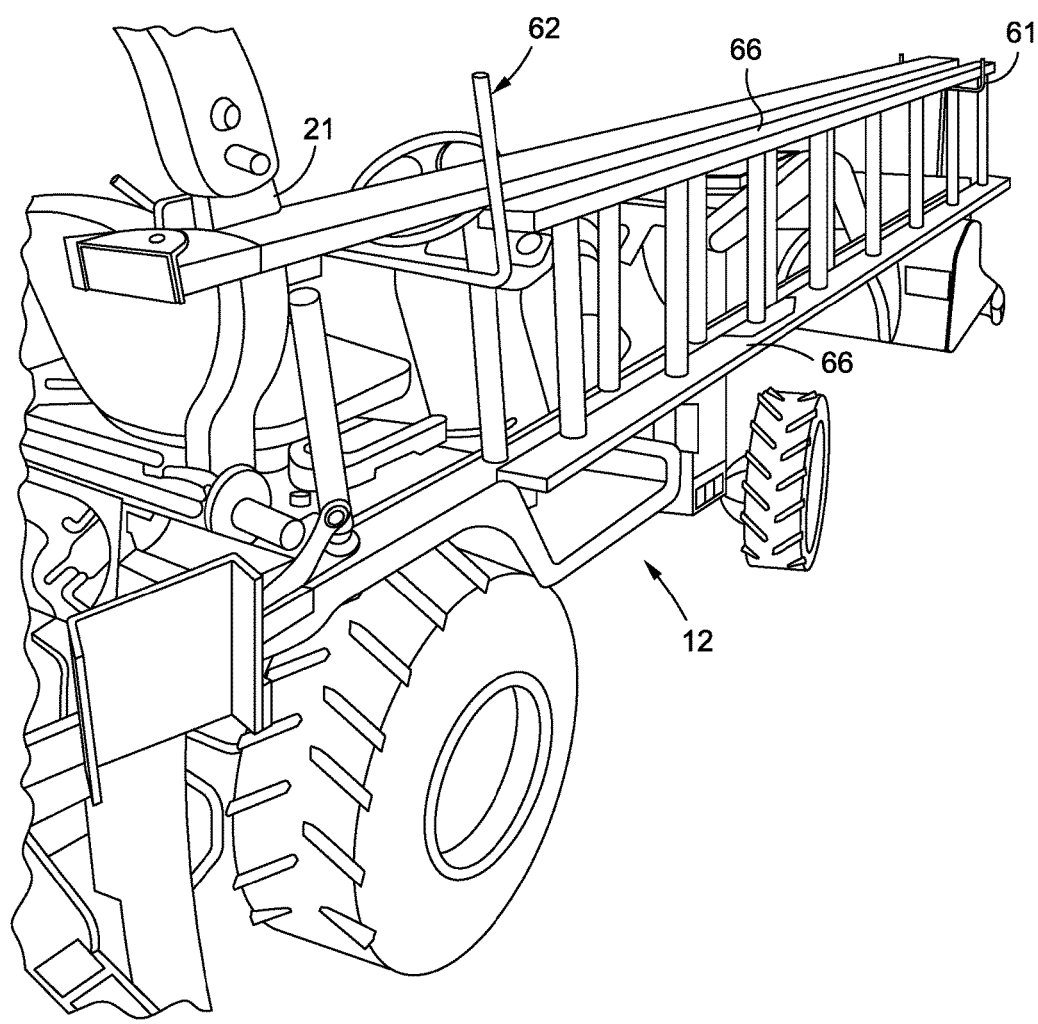
FIG. 8 is a perspective view from the rear, showing the rack assembly of FIG. 6 being used to transport a ladder on a tractor.

In another aspect of the invention, shown in FIGS. 6-8, the tool-carrying assembly includes a front rack element 60 for supporting the front end of at least one elongated item such as a ladder 66 or board 68, and a rear rack element 62 for supporting the rear end of the item. The front rack element 60 comprises a generally U-shaped member or hook carried on the upper portion of a rod 63 configured to be inserted in a vertically upright position in one of the tubular mounting sleeves 57 on the rear wall 48 or a side wall 50 of the storage compartment 28, in place of one of the orientation rods 58 *a* or *b*. The rear rack element 62 is a generally backwards L or U-shaped member or hook configured to extend laterally from the roll bar 21 or similar structure at the rear of the vehicle 12. Preferably, the rear rack element 62 is removably held within a cylindrical support sleeve (not shown), similar to the support sleeves 57 on the rear or side walls of the storage compartment 28, but extending laterally from the roll bar 21.

To transport an elongated item such as a board 68, a user simply places the item 68 on top of the front and rear rack elements 60, 62, so that the front end of the item 68 is cradled between the two upstanding arms of the U-shaped member 60 and the rear end of the item 68 is cradled between the one upstanding arm of the backwards L-shaped member 62 and the roll bar 21, as shown in FIG. 7.

To transport a ladder 66, the user turns the ladder on one side and places it such that one of the upstanding arms of the U-shaped member 60 extends through the space between two adjacent rungs at the front end of the tractor, and the single upstanding arm of the backwards L-shaped member 62 extends through the space between two adjacent rungs at the rear end of the tractor, as shown in FIG. 8.

In another aspect of the invention, a tool-carrying assembly 70 for mounting at the front end of a front-engine tractor comprises at least one implement holder 72 and a tool tray 74. In the example illustrated in FIGS. 9 and 11, the at least one implement holder comprises a set of four implement holders 72*a, b, c, d*, with one pair 72*a, b* positioned adjacent one of the sidewalls 17 of the tractor frame 14 and another pair 72 *c, d* positioned adjacent the opposite side wall. Each implement holder 72 has a tubular upper portion 75 configured to surround the lower portion of at least one elongated, vertically extending tool or implement 77 such as a shovel or rake, and a flat lower portion 76 configured to support the bottom end of the at least one implement 77. The upper portions of the implement holders are illustrated here as elongated tubes having square cross-sections. However, other geometries such as rings or sleeves having circular or rectangular cross-sections may also be suitable.

Figure 9:
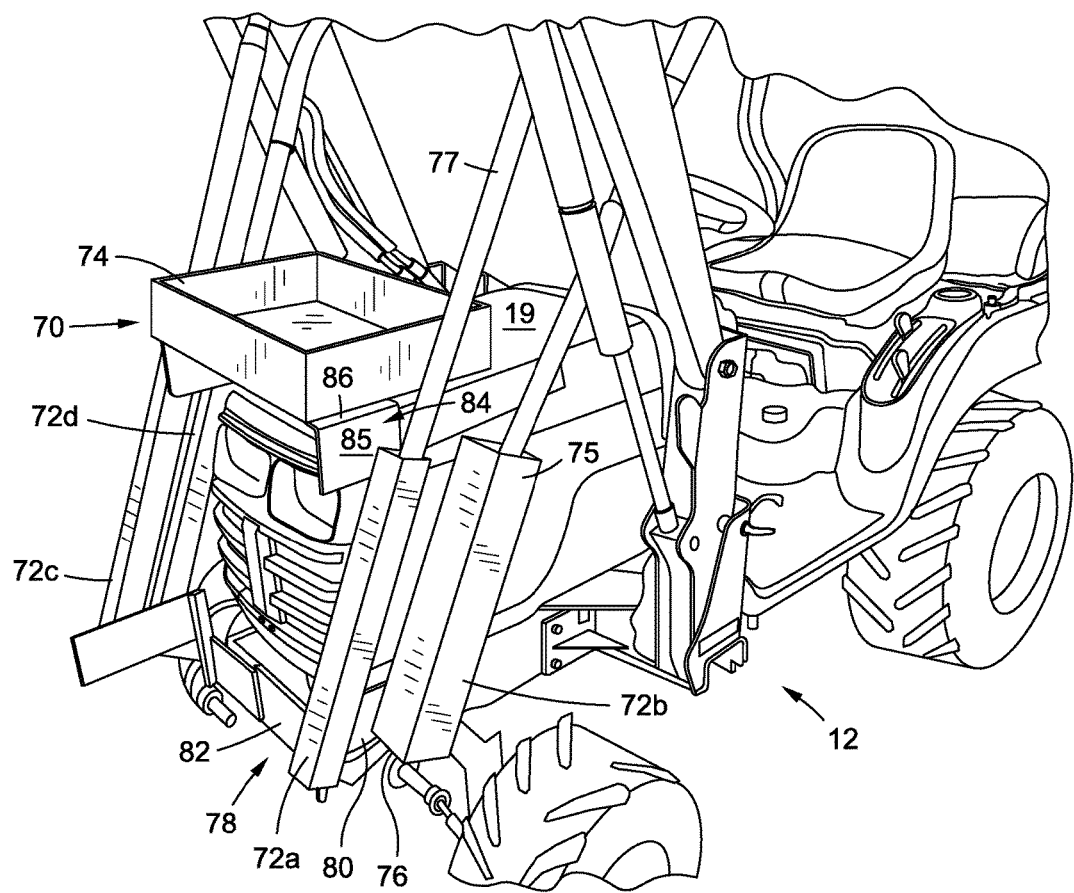
FIG. 9 is a perspective view from the front and left side, showing a tool-carrying assembly according to another aspect of the invention.
Figure 11:
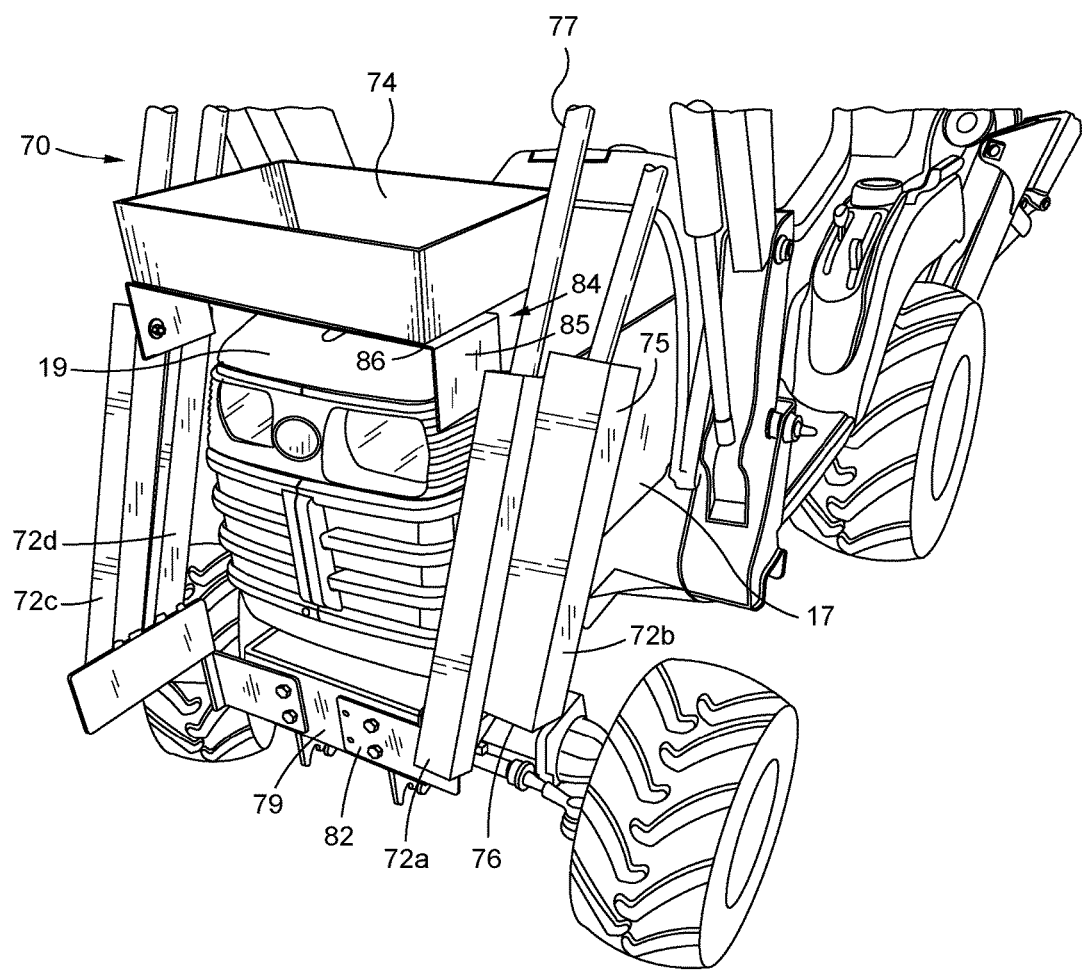
FIG. 11 is another perspective view of the tool-carrying assembly of FIG. 9.

In the example of FIGS. 9 and 11, each pair of implement holders 72*a, b* and 72*c, d* is secured proximate its side of the vehicle frame 14 by a corner brace 78 having a rearwardly extending flange 80 and an inwardly extending flange 82. The rearwardly extending flanges 80 couple both holders in each pair to one another as well as to a side of the vehicle bumper 79. Each inwardly extending flange 82 is secured to the front of the vehicle bumper by a fastener or fasteners such as bolts. In addition, the front holder 72*a, c* of each pair is secured to the tool tray 74 by a corner brace 84 having a downwardly extending leg 85 secured to the top end of the corresponding implement holder and an inwardly extending portion 86 supporting the bottom of the tool tray 74. Preferably the attachment between corner brace 78 and either the front implement holders 72*a, b* or the tool tray 74 is releasable, so that the tool tray 74 can be removed when it is not in use, while the implement holders 72 remain in place.

The length of the downwardly extending legs 85 of the corner brace 84 must be sufficiently long to provide sufficient clearance between the tool tray 74 and the hood 19 to allow sufficient cooling of the engine to minimize the likelihood of overheating. In addition, each implement holder 72*a, b, c, d* is preferably angled in a slightly rearward direction so that elongated, vertically upright implements do not extend into the path of the loader bucker 20 and/or interfere with its movement.

Figure 10:
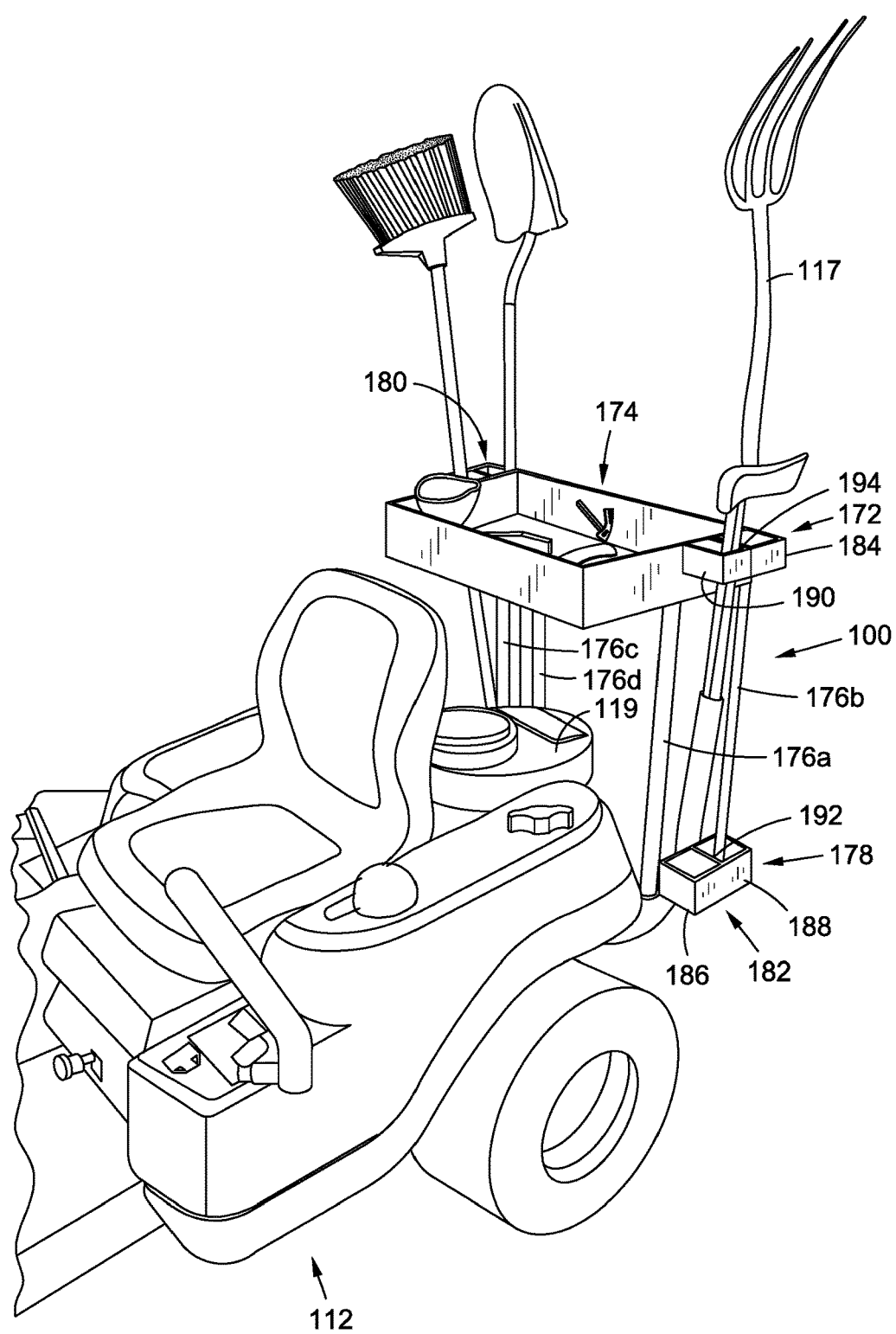
FIG. 10 is a perspective view from the rear, showing an alternate embodiment of the tool-carrying assembly.

In another aspect of the invention, illustrated in FIG. 10, tool-carrying assembly 100 for mounting at the rear end of a rear-engine tractor 112 comprises a tool tray 174 held above the hood 119 by a support member comprising at least one support leg 176 and a base plate (not visible) configured to overly the rear bumper of the vehicle (also not visible). In the illustrated embodiment, the at least one support leg 176 comprises a set of four support legs 176*a, b, c, d* arranged in pairs beneath opposite sides of the tray 174. The length of the legs 176 *ab, c, d* is selected to provide sufficient clearance between the tool tray and the engine to avoid interference with exhaust and allow sufficient cooling of the engine.

A set of implement holders 172 is secured to the tool tray 174. Any number of implement holders may be provided in the set, but in the illustrated embodiment, the set 172 comprises a first implement holder 178 extending laterally from one side of the tool tray 174, and a second implement hold 180 extending laterally from the opposite side of the tool tray 174. Each implement holder includes a bottom portion 182 and a top portion 184. As illustrated, the bottom portion 182, which preferably extends laterally from the base plate of the support member, comprises a bottom wall 186 for supporting the bottom end of a tool 117, and a perimeter portion 188 for surrounding the bottom end of the tool 117. The top portion 184 includes a perimeter portion 190 for surrounding a higher portion of the tool 117. Bottom portion 182 and top portion 184 may be rectangular in cross-section, as shown, with a partition wall 192, 194 dividing each portion into two square receptacles for supporting one tool each, but other geometric configurations would also be suitable.

The top portion 184 of each implement holder may be integral with the tool tray 174, which in turn may be integral with the support legs 176*a, b, c, d*, each of which may be integral with the bottom portion 182 of the corresponding implement holder as well as with the base plate of the support member. Thus, the entire tool-carrying assembly 100 may be formed as a unitary body, which may be molded from a lightweight plastic material. Alternatively, lightweight metals such as aluminum could be used, and the individual components of the assembly could be permanently secured to one another by welding, or detachably secured by conventional fasteners.

While the principles of the invention have now been made clear in the illustrated embodiment, there may be immediately obvious to those skilled in the art many modifications of structure, arrangements, proportions, elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What is claimed is:

1. A tool carrying assembly configured for use with a material-handling vehicle including a front portion having an engine-protecting hood, a bucket, a pair of bucket support arms connected to the opposite sides of the frame and the bucket and configured to move the bucket between a lowered position in front of the hood and a raised position above the hood, and a front bumper, the tool carrying assembly comprising:
   a) a first elongated, generally tubular implement holder configured to surround and support a first tool having an elongated handle, the first implement holder having a top end and a bottom end and inclining rearwardly at an oblique angle with respect to the front bumper;
   b) a second elongated, generally tubular implement holder configured to surround and support the first tool having an elongated handle, the second implement holder having a top end and a bottom end and inclining rearwardly at an oblique angle with respect to the front bumper;
   c) a first mounting flange coupled to the bottom end of the first implement holder and configured to extend laterally across the front bumper toward the second implement holder;
   d) a second mounting flange coupled to the bottom end of the second implement holder and configured to extend laterally across the front bumper toward the first implement holder;
   e) at least one fastener configured to secure the first and second mounting flanges to the front bumper;
   f) a tray configured to contain at least one tool, the tray including a horizontal bottom surface extending between the first and second implement holders; and
   e) at least one tray-supporting member coupled to the top ends of the implement holder and configured to support the tray in an elevated position sufficiently spaced above the hood to allow enough air flow between the hood and the tray-supporting member to cool the engine and minimize chances of overheating.

2. A tool-carrying assembly according to claim 1, wherein the tray-supporting member comprises a corner brace including:
   a downwardly extending leg secured to a top end of at least one of the implement holders; and
   an inwardly extending portion extending at a right angle to the downwardly extending leg and supporting the tool tray.

* * * * *